Jan. 25, 1972  W. HUBER  3,637,640
ORGOTEIN STABILIZED WITH SACCHARIDE, PROCESS AND PRODUCTS
Filed May 4, 1970
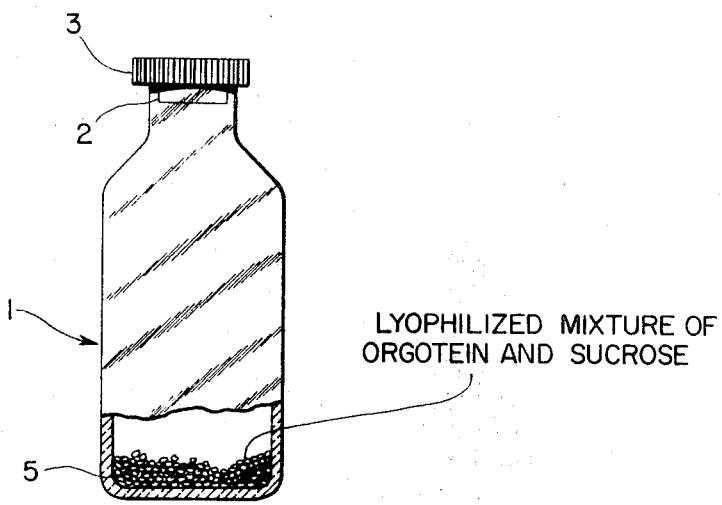
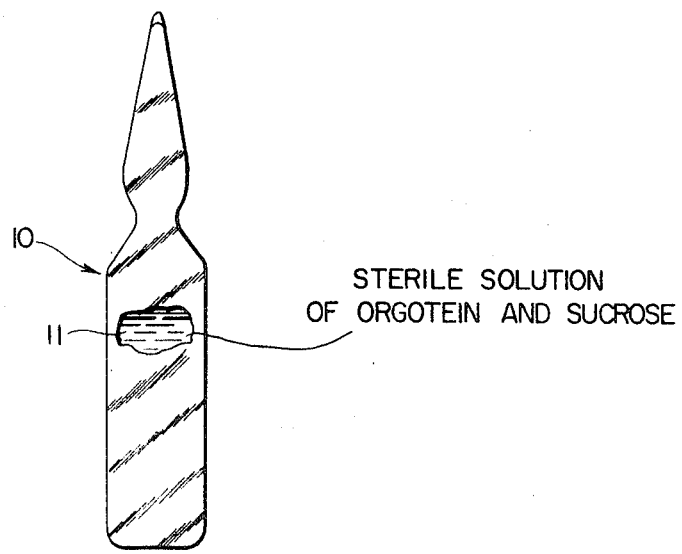
INVENTOR
WOLFGANG HUBER
BY *Millen, Rapter & White*
ATTORNEYS

United States Patent Office 3,637,640
Patented Jan. 25, 1972

3,637,640
ORGOTEIN STABILIZED WITH SACCHARIDE, PROCESS AND PRODUCTS
Wolfgang Huber, San Francisco, Calif., assignor to Diagnostic Data, Inc., Palo Alto, Calif.
Continuation-in-part of application Ser. No. 657,971, Aug. 2, 1967. This application May 4, 1970, Ser. No. 34,006
Int. Cl. C07g 7/04
U.S. Cl. 260—115          17 Claims

ABSTRACT OF THE DISCLOSURE

Sucrose, glucose, mannose, and certain pentose, hexose and heptose saccharides improve the stability of orgotein to lyophilization and storage. Orgotein is the name assigned by USCAN to an isolated, substantially pure, soluble, globular, non-toxic and substantially non-antigenic metalloprotein having anti-inflammatory and other pharmacodynamic activity.

BACKGROUND OF THE INVENTION

This invention relates to stabilized orgotein compositions. This is a continuation-in-part of application S.N. 657,971, filed Aug. 2, 1967 as a continuation-in-part of application S.N. 576,454, filed Aug. 31, 1966, both now abandoned.

The need to stabilize orgotein became apparent when the orgotein protein was purified to such an extent that partial denaturation occurred during lyophilization, irrespective of how it was carried out. This is not unusual for pure proteins and has been observed and described for numerous other proteins once they pass a certain degree of purification.

It is well-known that highly purified proteins are best stabilized with small amounts of other proteins or nucleoproteins, such as albumin and DNA. Other high-molecular weight compounds of biological origin often work equally well, e.g., marine colloids (carrageenin), starch, dextrane and other polysaccharides, and phospholipids. However, because the protein component of this invention is administered by injection, all these products are unsuitable either because of allergenicity, insufficient solubility, non-isotonicity, in some cases potential toxicity, or a combination thereof. In addition, and often more important, other proteins and/or lipoproteins lower the biological efficacy of orgotein when given in admixture with it.

Similar limitations apply to many other chemicals that have been used successfully as protein stabilizers, such as nucleotides, glutathione and other thiols and sulfites. Still others include the common buffers, terpenes, polycations and polyanions. Polycations include protamine-sulfate, polylysine, polyvinylamide, and 1,10-di-aminodecane. Polyanions include polystyrenesulfates, polyvinylsulfates, sodium - dodecylsulfate, dextran sulfate and others. P. Burnfeld et al., Arch. Biochem. Biophy., 111, 31 (1965) is a representative example of the use of polycations and polyanions in the stabilization of various highly-purified proteins. Again, while several of these compounds might work well as stabilizers, they are useless for orgotein because of toxicity, allergenicity and isotonicity considerations.

Another example is the publication of Wakid and Mansur, J. Mol. Pharmacology, 1, 53 (1965) which explores the protective effect on phosphofructokinase of hexose-phosphates, nucleotides, glutathione and sulfate or phosphate ions, either alone or preferentially in combination. Examination of the results shows that the Wakid-Mansur approach does not solve the problems for orgotein either. The nucleotides, to be even partially effective, must be used at least at 5 times excess on a weight per weight basis, eliminating them for isotonicity and allergenicity reasons, ignoring costs. Glutathione cannot be used because of its interaction with the novel protein and the consequent loss of solubility and efficacy. Of the hexose-phosphates, fructose-1,6-diphosphate works best and in principle could have been a satisfactory, albeit very costly choice for orgotein. Its protective effects depend, however, on the presence of glutathione, mercaptoethanol, and inorganic ions, all of which make the combination useless for orgotein. The statement of the authors that the free monosaccharides had no protective effect, even at $10^{-2}$ M or 250 times excess of stabilizer over protein, in fact contra-indicates sugars as potential stabilizers for orgotein.

Various saccharides have previously been used in combination with proteinaceous materials.

In 2,165,371 glycerol together with tri-cresol is used as a bacteriostatic preservative for a sarcoma antigen. In 2,827,452 vitamin A and other autooxidizable compounds of low molecular weights are protected from oxidation by formation of inclusion-compounds with high molecular weight polysaccharides such as dextrins and starch. In 2,908,614, sensitive materials of biological origin are protected during freeze-drying with dextran, a very high molecular weight complex polysaccharide. In 3,024,167, a protein hydrolysate for intraveneous use is stabilized by a gelatin hydrolysate. In 3,057,781, albumins, blood proteins, etc. are stabilized with innert sugars. In 3,072,532, a trypsin preparation for buccal use is solubilized and stabilized by mixtures of polyethylene glycol, vegetable gums, sugar alcohols, soluble starches, soluble cellulose derivatives, dextrose, levulose, inositol, arabinose and beta-lactose. In 3,089,815, injectable low molecular drugs are converted into "depot action" preparations by combination of the water soluble drugs with fibrinogen which is coagulated after injection thus causing the depot effect. Glycerol is used to prevent coagulation prior to injection. In 3,133,861, measles vaccine is stabilized with lactose-glutamate mixtures containing very large amounts of lactose. In 3,135,663, a BCG vaccine is stabilized with dextran. Specifically excluded are free glycerol, monosaccharides, sugar alcohols, polysaccharides containing a carbonyl group, and polysaccharides metabolized by the organisms to a carbonyl group containing compound. In 3,133,001, enzymes are stabilized with sucrose, lactose or maltose. In 3,143,473, polio vaccine is absorbed into a sugar cube for oral administration. In 3,186,908, a vaccinia virus (pox) vaccine is stabilized by the addition of a mixture of lactose and calcium lactobionate. This and other vaccines are very complex mixtures of numerous gamma globulins of high molecular weight. In 3,214,340, a measles vaccine is stabilized by sorbitol. Other carbohydrates are much less effective as stabilizers. In 3,228,834, a preparation of chlordiazepoxide for parenteral injection is dispersed in a medium containing maleic acid, polyoxyethylene and an OH containing aliphatic, $C_2$–$C_6$ compound such as glycerine, propylene glycol, sorbitol, glucose. In 3,259,546, a vaccinia virus preparation is protected by a long list of compounds. Specifically excluded are carbohydrates such as glucose, sucrose and insulin, which have little protective effect.

It is apparent a wide variety of compounds of highly diverse structure have been used with varying degrees of success as stabilizers for various proteins. There is no pattern of operability between them. Each protein requires a different type of stabilizer. A stabilizer which is highly effective with one protein often is completely ineffective with others.

SUMMARY OF THE INVENTION

The invention sought to be patented, in its composition aspect, resides in a composition comprising orgotein in stabilized admixture with (a) sucrose; (b) pentose, hexose and heptose monosaccharides having a hydroxy group on the carbon atom adjacent to a free keto or aldehyde carbonyl group and whose spatial configuration is opposite that of two hydroxy groups on the next two adjacent carbon atoms; (c) alkyl acetals of pentose, hexose and heptose monosaccharides; (d) glucose; or (e) mannose. In more specific composition aspects, the invention resides in aqueous solutions and lyophilized solid mixtures thereof storable at room temperature. In its article of manufacture aspect, the invention resides in sterile injectable solutions thereof and lyophilized sterile mixtures thereof hermetically sealed in a container suitable for storage of the solution prior to use and for reconstitution of the lyophilized mixture into an injectable form thereof, respectively. In a process aspect, the invention resides in a process for drying a solution of the protein in stabilizing admixture with such a saccharide. In another process aspect, the invention resides in purifying such a protein metal chelate while in the presence of such a saccharide.

OBJECTS

It is an object of this invention to provide lyophilized orgotein as a mixture with sucrose or other stabilizing saccharide as defined herein. Another object is to provide such a mixture in solid form, particularly in sterile, solid form. Another object is to provide such a mixture as a sterile injectable solution. Still another object is the provision of an article of manufacture comprising such a solid, sterile mixture hermetically sealed in a container suitable for reconstituting the mixture into a form suitable for injection. Still another object is the provision of an article of manufacture comprising a sterile injectable solution thereof sealed in a container suitable for storage of the solution prior to use. A further object is the provision of a process for purifying and lyophilizing orgotein in the presence of such a saccharide without concomitant denaturation. Other objects will be apparent to those skilled in the art to which this invention pertains.

DETAILED DESCRIPTION OF THE INVENTION

The following is a description of making and using the invention which will enable one skilled in the art to make and use the same, including the best mode contemplated of carrying out the invention.

With reference to the drawing, in FIG. 1 there is shown a conventional vial 1 sealed with a rubber stopper 2 which is covered with an aluminum cap 3 and containing hermetically sealed therein a lyophilized sterile mixture of sucrose and orgotein 4. FIG. 2 shows a sealed ampule 10 containing a sterile isotonic aqueous solution of sucrose and orgotein 11.

In U.S. patent application Ser. No. 576,454, filed Aug. 31, 1966 as a continuation-in-part of application Ser. No. 494,048, filed Oct. 8, 1965, now abandoned, Belgium Pat. 687,828 and Netherlands Pat. 66/14177, there is disclosed and claimed a novel isolated injectable protein metal chelate having unique pharmacodynamic activity. As disclosed in the refiled version thereof, viz, Application (DDI 4.1–17), filed Mar. 2, 1970, that protein metal chelate in isolated, substantially pure form has been assigned the non-proprietary name of orgotein. Orgotein is produced by a process which optionally includes its lyophilization to a dry powder. Orgotein is highly susceptible to denaturation during lyophilization. Moreover, aqueous solutions of and lyophilized forms of orgotein are not sufficiently stable to be storable at room temperature, except for brief periods of time. Both of these problems are serious disadvantages from a commercial point of view. Orgotein is isolated in final yields as low as 0.003%, calculated on the weight of the natural source of the protein. Thus, the 25% or more loss of the purified orgotein on lyophilization is a serious loss. Further, the denatured protein produced during lyophilization or on storage at room temperature is insoluble and requires filtration of the reconstituted solution before injection, another serious problem associated with its use commercially.

The lyophilized mixtures of this invention comprising orgotein and sucrose or other saccharide as defined herein are substantially and ordinarily completely free of insoluble protein. They readily reconstitute to a clear solution. Equally important, both dry mixtures and solutions of the protein and stabilizing saccharide are storable at room temperature and higher for much longer periods of time than orgotein alone and mixtures of orgotein and non-stabilizing types of saccharides. The compositions of this invention thus represent an improvement over lyophilized pure orgotein which is of great technical and commercial importance.

SACCHARIDE STABILIZERS

It was found that certain but only certain water soluble polyhydroxy compounds are surprisingly effective as stabilizers against denaturation of orgotein. Not only do they protect the orgotein protein against denaturation during its isolation from other proteins with which the orgotein protein is associated in natural sources thereof, it also increases the resistance of orgotein to denaturation on storage at temperatures above 4° C., either as a solution or a dried solid. This latter ability is particularly important because it permits orgotein, particularly in its lyophilized form, to be shipped and stored at room temperature, something not possible with the pure orgotein protein alone.

The saccharide stabilizers used in the compositions of this invention include (a) sucrose, (b) the pentose, hexose and heptose monosaccharides in which the carbonyl group is in the form of an alkyl acetal, e.g., methyl, ethyl or other lower alkyl acetal, such as methyl glucoside, methyl galactoside, (c) a pentose, hexose and heptose aldose or ketose, in which the hydroxy group adjacent the free carbonyl group has a spatial configuration opposite that of the next two adjacent hydroxy groups, e.g., galactose, fructose, fuccose, arabinose, aldose galactoheptulose, sedoheptulose, etc., (d) glucose, and (e) mannose. For a listing of saccharides which include the above-defined polyhydroxy compounds see Kirk and Othmer, Enc. Chem. Tech., Interscience Pub., (1954) vol. 13, pages 228–236.

It was first believed a non-reducing sugar would be superior to reducing sugars in view of the well-known Maillard ("Browning") reaction. This reaction frequently has been observed to occur during lyophilization of basic proteins in the presence of reducing sugars, resulting in brown insoluble products by virtue of interaction of ε-amino groups, (lysine) with the aldehyde or keto groups of the reducing sugars. Since orgotein is rich in lysine, and needs an alkaline pH for retention of conformation, it was assumed a "browning reaction" would occur and, therefore, make impossible the use of reducing sugars as stabilizers.

Surprisingly, not only do two reducing sugars (galactose, fructose) function as excellent stabilizers, but two non-reducing sugar alcohols (sorbitol, manitol) and the non-reducing inositol were less effective. This phenomena appears to be related to the steric configuration of the stabilizers. Both fructose and galactose have two adjacent hydroxyls sterically located on the same side of the molecule. In addition, these two adjacent hydroxyls are non-adjacent to the functional group, i.e., the aldehyde or the keto group. This steric arrangement may permit the sugar molecule to align itself with the protein molecule in such a way that the ε-amino groups of lysine would be spatially unable to react with the aldehyde or the keto group of the reducing sugar.

In a disaccharide the steric arrangement of the sugar molecule makes such an alignment as described for the two hexoses less readily possible, which may explain the less effectiveness of maltose and lactose, which also are reducing sugars. Sucrose is non-reducing in character and there is no free carbonyl group for interaction; hence steric configuration is not crucial. Consistent with this hypothesis, fuccose and arabinose are very effective. Their steric arrangement is analogous to the very effective galactose.

Absorbance values at 280 mμ are of interest. The higher the $\Delta A_{280}$ values, the higher the eventual degree of denaturation of the protein. This apparently means the degree of denaturation to be expected in the presence of a particular sugar is preceded by subtle changes in the conformation of the native orgotein molecule which are signalled by the absolute values for the respective $\Delta A_{280}$. In some of the disaccharides and in two sugar alcohols the trend is the same, although the absolute values are not quite as valid because the turbidity of the solution interferes with the reliable determinaion of $A_{280}$. In the samples of orgotein without stabilizer, reliable determination of $A_{280}$ is not possible because of the presence of insoluble flakes in the turbid solution.

The physical composition of the lyophilized orgotein stabilized with the preferred galactose, fructose or sucrose, is such that it dissolves exceptionally readily both in water and common buffers resulting in a sparklingly clear solution. The rate of solubility in fact is considerably better than that of orgotein alone.

The addition of a saccharide stabilizer as defined herein, especially sucrose, galactose or fructose, also increases the shelf life of solutions of orgotein. The stability at 4° C. of a solution thereof in isotonic saline containing two parts of sucrose per part of orgotein was compared with a solution of orgotein in isotonic saline alone. Both solutions were periodically checked by $A_{280}$ absorption and by visual inspection for turbidity. After one week the orgotein solution without sucrose was slightly turbid and the $A_{280}$ as well as the dry-weight determination indicated a protein loss of 15–20 percent. The solution with sucrose was perfectly clear even after three weeks and the dry weight and the $A_{280}$ were the same at beginning and end within the limit of experimental error. 2:1 maltose and dulcitol solutions showed similar stabilities for a week or more.

Amounts of 1 part by weight or less of sugar per part of orgotein appear to be insufficient for optimum protection. Two parts of sucrose per part of orgotein work very well. Larger amounts of the less efficient stabilizers are sometimes required to obtain optimum stabilization.

Practical upper limits are defined in terms of isotonicity in addition to the effectiveness of the selected saccharide as a stabilizer. The following tabulation illustrates this. Calculations are based on milligrams of sugar per milliliter of solution. The sugar weights in turn are calculated on an average orgotein concentration of 1 mg./ml.

| | At isotonicity, mg./ml. | Isotonicity increase due to stabilizer; mg./mg. of orgotein | | | |
|---|---|---|---|---|---|
| | | 2.0 | 4.92 | 5.05 | 9.25 |
| NaCl | 9.0 | | | | |
| Fructose | 50.5 | 3.96% | | 10% | |
| Galactose | 49.2 | 4.07% | 10% | | |
| Sucrose | 92.5 | 2.16% | | | 10% |

Two parts of sugar per part of orgotein represent an increase in isotonicity of 3.96%, 4.07%, and 2.16% for fructose, galactose and sucrose, respectively. Pharmacologically, a 10% increase above isotonicity is acceptable in intramuscular injections particularly for such readily diluted and absorbed products as sodium chloride and sugars. At 10% hypertonicity the practical upper limits of stabilizer are fructose 5.05 parts; galactose 4.92 parts; and, sucrose 9.25 parts per part of orgotein.

In terms of isotonicity increase, sucrose is the preferred of the above three stabilizers because the relative degree of hypertonicity is the smallest on a weight-per-weight basis.

Isotonic solutions containing larger amounts of sugars can be readily produced by using saline at less than 0.9 percent concentration. However, in practice, this would be cumbersome since it would call for dilution of sterile isotonic saline with sterile water in appropriate ratios, thus requiring calculation and extra operations.

If for stability or other purposes, even larger amounts of saccharide were desirable then saline could be replaced althogether by isotonic solutions made up solely from the respective sugars or mixtures thereof. In this instance the maximum amounts would be fructose, 50.5 mg./ml.; galactose, 49.2 mg./ml.; and sucrose, 92.5 mg./ml.

ORGOTEIN

Orgotein is the subject of U.S. patent application S.N. (DDI 4.1–17), filed Mar. 2, 1970 as a continuation-in-part of application S.N. 576,454, filed Aug. 31, 1966. Orgotein is soluble in water, saline, and buffer solutions and injectable without manifesting the antigenic reactions typical of foreign-body proteins. Its elemental, infrared, ultraviolet, spectrographic, optical rotary dispersion and other analyses are consistent with its metallo-protein chelate structure.

Orgotein is the non-proprietary name adopted by the United States Council for Adopted Names for an isolated, pure, water-soluble, fairly low molecular weight anti-inflammatory protein metal chelate chelated with a divalent metal. (See J.A.M.A., May 26, 1969, volume 208, No. 8; Huber et al., Abstracts Seventh Annual Meeting of the Society of Toxicology, Washington, D.C., March 1968; Carson et al., Proceedings, Meeting Federation American Societies Experimental Biology, Atlantic City, N.J., April 1970.)

Orgotein defines a family of protein congeners having a characteristic combination of physical, chemical, biological and pharmacodynamic properties. Each of these congeners is characterized physically by being the isolated, substantially pure form of a globular, buffer and water-soluble protein having a highly compact native conformation which, although heat labile, is stable to heating for several minutes at 65° C. when dissolved in a buffer solution containing a salt of a divalent metal having an ionic radius of 0.60 to 1.00 A, and which on gel electrophoresis gives a characteristic multiple-band pattern. Chemically, each is characterized by containing all or all but one of the essential aminoacids, a small percentage of carbohydrate, no lipids, 0.1 to 1.0% metal content provided by one to 4 gram atoms per mole of one or more chelated divalent metals having an ionic radius of 0.60 to 1.00 A., and substantially no chelated monovalent metals or those that are cell poisons in the molecule. Pharmacodynamically, each of the congeners is characterized by being a nontoxic, only weakly antigenic injectable protein whose pharmacodynamic properties include anti-inflammatory activity which, like its compact conformation, is related to its chelated divalent metal content. Immunological relatedness of an orgotein congener is sufficient to enable its antibodies prepared in the rabbit or other suitable animal to recognize as an antigen one or more other orgotein congeners and/or for one or more of the antibodies to other orgotein congeners to recognize it as an antigen, as evidenced, for instance, in gel immunoelectrophoresis and/or gel immunodiffusion. Although some of the physical and chemical properties and the type and degree of pharmacodynamic efficacy of orgotein vary from congener to congener, all orgotein congeners possess the above combination of properties.

Orgotein is readily soluble (to 50 mg./ml.) in water and common aqueous buffers, pH 6.5–10.0. Orgotein's metal ion content and composition are related to its pharmacodynamic activity. Bivalent cations with ionic radii of 0.6–1.0 A. are the most effective. A mixture of Cu, Mg, and Zn at a total content of 2–4 gram atoms per mole produces the highest level of physiological activity. The relative amounts of each of the three metals can vary broadly within this total. Most samples also contain trace amounts of Ca, Fe, and Si as the only other metals detectable by emission spectroscopy. All metals can be removed by prolonged dialysis against $10^{-2}$ M EDTA or $10^{-3}$ M orthophenanthroline. At levels below 2 gram atoms per mole, the biological effectiveness is diminished, and below 1 gram atom per mole the protein progressively precipitates, losing biological activity. The metal ions thus appear to play a decisive role in maintaining the molecular conformation essential for biological activity, acting as "locking pins" by producing intra-molecular cross links. Differences in affinity for buffer anions probably explain why, at identical strength, the orgotein is less stable in certain buffers (phosphate, borate) than in others (tris, maleate, EDTA).

The aminoacid composition of the orgotein congeners is remarkably consistent irrespective of the source from which it is isolated according to the process of this invention. The close relatedness of orgotein congeners is apparent from the surprisingly small variances in the aminoacid analyses for a protein isolated from such diverse sources as beef liver and chicken red blood cells, as shown in Table I below.

Table II lists the aminoacid residues of several orgotein congeners as calculated from their apparent molecular weight. Table III lists other properties of various orgotein congeners isolated from a buffer solution containing a mixture of $Mg^{++}$ ($10^{-3}$ M), $Cu^{++}$ ($10^{-4}$ M) and $Zn^{++}$ ($10^{-5}$ M) ions.

TABLE I.—AMINO ACID COMPOSITION OF ORGOTEIN CONGENERS

[Grams per 100 grams protein]

| Aminoacid | Liver (beef) | Red Blood Cells (RBC) | | | | | |
|---|---|---|---|---|---|---|---|
| | | Beef | Sheep | Horse | Rabbit | Chicken | Human |
| Alanine | 6.4 | 6.3 | 6.2 | 5.9 | 6.0 | 7.3 | 7.1 |
| Arginine | 2.9 | 2.6 | 3.2 | 2.0 | 2.8 | 2.6 | 2.1 |
| Aspartic acid | 10.7 | 11.2 | 11.4 | 10.8 | 10.8 | 11.4 | 11.8 |
| Cystine/2 | 2.5 | 2.0 | 1.8 | 2.0 | 1.7 | 3.1 | 2.4 |
| Glutamic acid | 7.8 | 7.7 | 7.2 | 10.0 | 8.0 | 8.3 | 8.8 |
| Glycine | 16.4 | 16.3 | 17.2 | 15.9 | 17.1 | 17.7 | 16.1 |
| Histidine | 4.0 | 5.0 | 4.5 | 6.2 | 5.3 | 5.4 | 4.5 |
| Isoleucine | 5.2 | 5.7 | 5.8 | 4.7 | 4.9 | 4.8 | 5.3 |
| Leucine | 6.0 | 5.4 | 5.5 | 5.9 | 6.9 | 4.7 | 6.4 |
| Lysine | 6.6 | 6.6 | 8.1 | 8.8 | 6.7 | 6.5 | 7.2 |
| Methionine | 1.2 | 0.8 | 0.6 | 1.9 | 0.9 | 1.0 | 0.3 |
| Phenylalanine | 2.8 | 2.5 | 2.2 | 2.9 | 2.8 | 2.6 | 2.5 |
| Proline | 4.0 | 4.1 | 4.8 | 3.7 | 4.2 | 4.1 | 3.7 |
| Serine | 5.4 | 5.3 | 4.7 | 4.8 | 5.7 | 4.6 | 6.0 |
| Threonine | 7.8 | 7.7 | 6.2 | 5.2 | 6.6 | 5.8 | 5.5 |
| Tryptophan [1] | 0.3 | 0.2 | 0.3 | 0.3 | Nil | 0.3 | N.D. |
| Tyrosine | 0.6 | 0.7 | 0.6 | 0.3 | 0.2 | 0.7 | 0.3 |
| Valine | 9.7 | 10.0 | 9.1 | 8.9 | 9.8 | 9.4 | 9.6 |
| Total | 100.3 | 100.1 | 99.4 | 100.2 | 100.4 | 100.3 | |

[1] Determined spectrophotometrically according to Edelhoch, H., Biochem., 6, 1948 (1967).

TABLE II.—AMINOACID PROFILE OF ORGOTEIN CONGENERS

[Residues per mole]

| Aminoacid | Bovine | | Horse RBC | Sheep RBC | Rabbit RBC | Chicken RBC | Human RBC | Range | Average |
|---|---|---|---|---|---|---|---|---|---|
| | Liver | RBC | | | | | | | |
| Lysine | 20.5 | 20.5 | 27.3 | 25.1 | 20.8 | 20.1 | 22.3 | 20–27 | 22.4 |
| Histidine | 12.4 | 15.5 | 19.2 | 14.0 | 16.4 | 16.7 | 13.9 | 12–19 | 15.4 |
| Arginine | 9.0 | 8.1 | 6.3 | 9.9 | 8.9 | 8.1 | 8.1 | 6–10 | 8.3 |
| Aspartic | 33.2 | 34.7 | 33.5 | 35.3 | 33.5 | 35.3 | 36.6 | 33–37 | 34.7 |
| Threonine | 24.2 | 23.9 | 16.1 | 19.2 | 20.5 | 18.0 | 17.1 | 16–24 | 19.9 |
| Serine | 16.7 | 16.4 | 14.9 | 14.6 | 17.7 | 14.3 | 18.6 | 14–19 | 16.2 |
| Glutamic | 24.2 | 23.9 | 31.0 | 22.3 | 24.8 | 25.7 | 27.3 | 22–31 | 25.6 |
| Proline | 12.4 | 12.7 | 11.5 | 14.9 | 13.0 | 12.7 | 11.5 | 12–15 | 12.7 |
| Glycine | 50.8 | 50.5 | 49.3 | 53.3 | 53.0 | 54.9 | 49.9 | 49–55 | 51.7 |
| Alanine | 19.9 | 19.5 | 18.3 | 19.2 | 18.6 | 22.6 | 22.0 | 18–23 | 20.0 |
| Cystine-½ | 7.8 | 6.2 | 6.2 | 5.6 | 5.6 | 9.6 | 7.5 | 6–10 | 6.9 |
| Valine | 30.1 | 31.0 | 27.6 | 28.3 | 30.4 | 29.1 | 29.8 | 28–31 | 29.5 |
| Methionine | 3.7 | 2.5 | 5.1 | 1.9 | 2.8 | 3.1 | 0.9 | 1–5 | 2.9 |
| Isoleucine | 16.1 | 17.7 | 14.6 | 18.0 | 15.2 | 14.9 | 16.4 | 15–18 | 16.0 |
| Leucine | 18.6 | 16.7 | 18.3 | 17.0 | 21.4 | 14.6 | 19.8 | 15–21 | 18.1 |
| Tyrosine [1] | 1.9 | 2.2 | 1.6 | 1.9 | 0.9 | 2.2 | 0.8 | 1–2 | 1.6 |
| Phenylalanine | 8.7 | 7.8 | 9.0 | 6.8 | 8.8 | 8.1 | 7.8 | 7–9 | 8.2 |
| Tryptophan [2] | 0.9 | 0.7 | 0.9 | 0.9 | Nil | 0.9 | N.D. | 0–1 | 0.7 |
| Total | 311.1 | 310.5 | 310.6 | 308.1 | 312.3 | 310.9 | 310.3 | | 310.8 |

[1] Average of aminoacid analysis and spectrophotometric det.
[2] Spectrophotometric det.

TABLE III.—PHYSICO-CHEMICAL CONSTANTS OF ORGOTEIN CONGENERS

| | Bovine Liver | Bovine RBC | Horse RBC | Sheep RBC | Rabbit RBC | Chicken RBC |
|---|---|---|---|---|---|---|
| Isoionic point | 5.18 | 5.42 | 5.60 | 5.71 | 5.29 | 5.28 |
| $A^{1\%}_{280}$ glycine buffer, pH 8.5 | 2.3 | 2.2 | 2.3 | 2.5 | 1.1 | 2.9 |
| Lipids | Nil | Nil | Nil | | | |
| Carbohydrates [1] | 0.59 | 0.88 | 0.57 | 0.62 | 0.99 | |
| Immune (Ag/Ab ratios)[2] | 1:400 | 1:400 | 1:16 | 1:200 | 1:1 | 1:1 |
| Metals (GAPM) [3]: | | | | | | |
| Copper | 1.14 | 1.07 | 0.94 | 0.91 | 1.33 | 1.18 |
| Magnesium | 0.44 | 0.47 | 0.32 | 0.30 | Nil | 0.22 |
| Zinc | 2.08 | 1.86 | 1.48 | 1.97 | 2.19 | 2.28 |
| Calcium | 0.03 | 0.05 | 0.04 | 0.13 | 0.07 | 0.07 |
| Iron | 0.02 | 0.02 | Nil | 0.02 | 0.07 | 0.04 |
| Manganese | 0.03 | Nil | 0.01 | Nil | Nil | 0.02 |
| Silicon | 0.15 | 0.37 | 0.08 | 0.34 | 0.37 | 0.31 |
| Others | Nil | Nil | Nil | Nil | Nil | Nil |
| Bioassay (Ungar) [4]: | | | | | | |
| 0.4 mg./kg | 46.24 | 44.10 | 45.71 | 46.61 | 39.86 | 45.33 |
| 1.0 mg./kg | 35.80 | 36.50 | 35.94 | 34.14 | 36.50 | 38.27 |

[1] Modified orcinol procedure, expressed as percent glucose.
[2] Anti-bovine RBC Rabbit DEAE-purified γ-globulin.
[3] Emission spectroscopy.
[4] Max. mean acceptance values at 4 animals: 57.74 (0.05); 53.89 (0.01); 49.66 (0.001).

As also shown in Table 1, orgotein is formed of all but one essential aminoacids. The aminoacid residue content does not vary greatly from congener to congener. With most congeners a substantial variation (more than 6 residues) in the number of residues of any aminoacid occurs in no more than 3 of the aminoacids.

The apparent molecular weight of beef liver orgotein as determined by gel filtration using Sephadex G-200 is about 34,000. Orgotein isolated from beef red blood cells (RBC) was found to have an apparent molecular weight of about 34,500, a variation well within the limit of error of the method. By gel filtration, the apparent molecular weight of horse RBC orgotein is 33,500; sheep RBC, 32,000; rabbit RBC, 34,000. These values are also within the limits of error for this method. The molecular weight value by G-200 gel filtration obtained for the congener from chicken RBC is 29,000. This apparent variation in molecular weight is probably due to the fact that gel filtration measures molecular volume and a difference in the conformation of a congener will cause a difference in molecular volume and thus an apparent difference in molecular weight values. In contrast, molecular weights calculated directly by aminoacid analysis indicate most congeners are quite close to beef liver orgotein in molecular weights.

Orginal molecular weight determinations established the molecular weight of beef liver orgotein at about 32,500. Subsequent studies indicated a lower figure but exhaustive studies have now established that beef liver orgotein has a total molecular weight of about 34,400 (±4%). This molecular weight is based on the average of the values obtained by osmometry, sucrose density gradient, sedimentation equilibrium, aminoacid profile and gel filtration on a Sephadex G-200 (Pharmacia Inc.) column 90 x 2.5 cm., eluted with saline and phosphate buffer (pH 7.4) using ribonuclease, chymotrypsin, bovine serum, albumin and gamma globulin as standards. Based on this molecular weight and about a 0.3% ash content, the best values for the protein chelate are a total of about 311 aminoacid residues and about 2-4 gram atoms of metals per molecule.

In the ultra-centrifuge, orgotein in normal saline moves as a uniform, sharp band, with a sedimentation coefficient (beef liver orgotein) of about 3.32±0.05 Svedberg units. Beef liver orgotein has an isoelectric point at about pH 5.5±0.2, and an isoionic point at 5.35±0.1. The isoionic point of other orgotein congeners varies somewhat, e.g., from about 5.0 to 5.7. The isoelectric point was determined by electrophoresis on cellulose acetate at different pH's using citrate-phosphate buffer. The isoionic point was determined according to J. Riddiford et l., Biochem, 239, 1079 (1964). The protein was thoroughly dialyzed to free it completely from all electrolytes and then lyophilized. 25.8 mg. of the lyophilized product were dissolved in 5 ml. deionized water, placed in a cell maintained at 25° C. under a nitrogen atmosphere and allowed to come to a stable pH (about 40 to 60 minutes).

The presence of carbohydrate in the protein product was first detected by disc gel electrophoresis, using the Schiff test (W. F. McGuckin and B. F. McKenzie, Clin. Chem. 4, No. 6, December 1965) on acrylamide and cellulose acetate electropherograms of orgotein. Tests with typical sugar reagents after prior acid hydrolysis, indicate the presence in beef liver orgotein of about 0.5–1% carbohydrate, expressed as commonly is done, in terms of glucose. The carbohydrate appears to be covalently bonded to the protein. The carbohydrate, however, is probably a pentose, methylpentose and/or glucuronic acid rather than a hexose as evidenced by known colorimetric reactions (Z. Dische, Methods in Carbohydrate Chemistry, 1, 486, Academic Press, N.Y. (1962)). Heptoses, 2 deoxypentoses, hexosamines and sialic acid also could not be detected. A typical elemental analysis of beef liver orgotein is C, 50.05; H, 7.92; O, 25.55; N, 16.00; S, 1.10; P, nil; Ash, <1%.

Gas chromatography and electrophoresis tests establish that orgotein is not a lipoprotein. It contains less than 0.01% lipid phosphorous, less than 0.1% cholesterol, less than 0.05% galactolipid and no detectable water-soluble glycolipids.

The orgotein congeners analyzed to date have numerous titrable ε-amino groups but few titrable —SH and —OH (tyrosyl) groups. For example, beef liver orgotein and beef RBC orgotein contain one titrable OH (tyrosyl) group N-acetylimidazole titration), one titrable-SH (p-mercuribenzoate) and 15–16 (beef liver) and 16–17 (beef RBC) ε-amino groups (trinitro-benzene-sulfonic acid titration).

Orgotein has at pH 7 an infrared spectrum curve typical of proteins.

Beef liver orgotein has a corrected $A_{280}$ (pH 7.0 buffer) of 0.23±0.02 (1 mg./ml.). In S.N. 576,454, the $A_{280}$ ultraviolet absorbance of substantially pure beef liver orgotein was reported as 0.585 (1 mg./ml.). Because the samples of orgotein described therein had a purity of at least 94%, this high absorbance was attributed to the tyrosine and tryptophane content of orgotein. Subsequent analytical studies have established that beef liver orgotein has only 3 such groups, which are too few to account for this high absorbance at $A_{280}$.

In the applications of W. Huber S.N. 3492 and S.N. 3538, both filed Jan. 16, 1970, and entitled "Orgotein Purification Process," there are described processes for removing traces of a tenacious extraneous protein in the samples of orgotein produced according to the process of S.N. 576,454. It was found that samples of orgotein which are free of this extraneous protein have a substantially lower $A_{280}$, i.e., <0.3. Thus, the high $A_{280}$ absorbance of the orgotein produced according to the process of S.N. 576,454 is due to the presence of this tenacious extraneous protein, which is rich in tyrosine and tryptophane residues.

In the visible spectrum, samples of orgotein which contain $Cu^{++}$ in the molecule exhibit a peak at 407 m$\mu$, which peak confirms the persence of chelated copper in the molecule.

In gel-electrophoresis, e.g., on polyacrylamide and agarose, orgotein gives a typical pattern shown multiple closely spaced bands at various pH's and at low ionic strength. At higher ionic strengths, they tend to contract into a single band. This multi-band electropherogram pattern is characteristic of orgotein congeners but the location of the bands relative to the origin can vary from congener to congener. A typical electropherogram pattern obtained for orgotein from beef liver in thin film, argarose gel is given in the table below. All values are approximate.

Conditions of electrophoresis:
  Agarose gel—Analytical Chemists, Inc.
  Buffer: 0.02 M tris: 0.15 M glycine: $1.2 \times 10^{-4}$ M EDTA
  0.08% thymol
  pH 8.45: conductivity 280$\mu_v$ (mhos)
  Power conditions: 3.5 ma. 300→370 v.

|  | Approximate band width (mm.) | Approximate distance from origin (mm.)[1] | Relative intensity |
|---|---|---|---|
| Band 1[2] | 3.0 | 2.8 | 45.1 |
| Band 2 | 3.2 | 9.5 | 38.2 |
| Band 3 | 2.5 | 15.8 | 16.6 |

[1] Center of origin through to center of band.
[2] Closest to origin (most cathodic).

Orgotein is isolated by a process which involves the at least partial purification and preferably isolation of the orgotein protein while it is in the form of a metal chelate whose predominant metal is one having an ionic radius from 0.65 to 0.79 A. If an isolated chelate is desired whose predominant metal is one having a lower or higher ionic radius, e.g., manganese or calcium (ionic radius 0.80 A. and 0.99 A., respectively), it can be produced by tarnschelating a chelate whose predominant metal is one having an ionic radius from 0.65 to 0.79 A., e.g., by processing with an excess of a buffer solution containing a The tangible embodiments of this invention which comprise orgotein possess the inherent use characteristics of ameliorating and mitigating in mammals the adverse effects of a stress condition, and exerting anti-inflammatory and anti-viral activity in mammals and other animals as evidenced by pharmacological and clinical evaluation. Pharmacological and clinical data has established the compositions of this invention are useful in the treatment of a variety of ailments and diseases in mammals, particularly those which result in inflammatory and related stress conditions manifesting themselves in the afflicted mammal. This utility has shown no specificity as to any particular species of mammal. The action of the orgotein is fast and effective. By way of example, orgotein in man and horses is useful in relieving the pain, tenderness and disfunction following acute traumatic injuries and in the treatment of orthopedic disfunction, i.e., bony exostoses. Orgotein also is effective in certain viral diseases such as human influenza A and B, viral horse pneumorhinitis, canine distemper, and disfunctions based on the families of herpes virus.

More specifically, orgotein is efficacious in ameliorating inflammatory conditions and mitigating the effects thereof, for instance those involving the urinary tract and the joints, in various mammals. It is useful in alleviating the symptoms of and the structural deformities associated with post-traumatic arthritis, and rheumatoid diseases, such as bursitis, tendonitis, osteoarthritis, non-surgical disc syndrome (spondylitis) and myositis. Diseases of the genito-urinary tract that responded to orgotein treatment include acute inflammatory bladder involvements, interstitial cystitis, benign prostate hypertropy, acute epididymitis and chronic nephritis, and inflammations associated with chronic urinary infection, such as urethral stricture, urethritis and prostatitis.

Orgotein also has utility in the treatment of diseases involving an imbalance or inactivation of the auto-immune system, alone and in combination with drugs conventionally used to treat such diseases. Typical are the "collagen" type diseases such as rheumatoid arthritis, lupus erythematosis, scleroderma; also allergic states, e.g., penicillin reaction, characterized by multiple wheals, indurations, erythemas, endemas and itching.

Because of its stress-relieving activity, states of shock can be reversed by orgotein, e.g., those induced by curare-like drugs, overwhelming sepsis, drug toxicity, surgical and traumatic shock, etc. even though it does not possess significant CNS stimulant activity.

The compositions of this invention can be prepared in pharmaceutical forms suited for injection by lyophilizing a solution of orgotein and stabilizing saccharide in a conventional manner. Solutions containing orgotein and the saccharide only or in combination with bacteriostats, bacteriocidal agents, systematically active steroids, e.g., the progestational, estrogenic, and drogenic and anti-inflammatory steroids, thickening agents, preservatives and pharmaceutically-acceptable coloring agents can be used. Salts, e.g., sodium chloride, in an amount which will provide an isotonic solution when the mixture is reconstituted with sterile distilled water can also be present.

The orgotein-saccharide mixture can also be formed into sterile solutions, suspensions, etc., suitable for injection without further modification or reconstitution.

The dry solid mixtures of this invention are stable for many weeks at room temperature without detectable denaturation of the protein in marked contrast to the protein alone, which badly deteriorates in a matter of several days at room temperature. The improved stability of aquous solutions of the mixtures of this invention at room temperature is equally striking, the protein alone deteriorating in a matter of hours whereas the mixture is stable for several days or weeks. For example, a solution of the protein and sucrose is stable without measurable denaturation at both room temperature and 37° C. for over a month. Even dulcitol and maltose, which are less effective than sucrose in protecting the protein against denaturation during lyophilization, protect solutions of orgotein for at least a week at room temperature before significant deterioration begins.

The improved stability of orgotein at room temperature when in admixture with sucrose or other saccharide defined herein renders topical and oral administration of the protein feasible. Ordinarily, such routes of administration are not commercially feasible when a pharmaceutical is not storable at room temperature because there are not suitable commercial means for storing such pharmaceutical forms prior to its sale and subsequent administration. Orgotein is remarkably resistant to proteolytic enzymatic degradation, which makes oral administration feasible.

Thus, the orgotein and saccharide mixture can be formulated in a preparation suitable for oral or topical administration in a conventional manner with the aid of one or more carriers or excipients. Examples of such types of topical preparations include ointments, lotions, creams, sprays, powders, drops (e.g., ear drops and eye drops), suppositories or retention enemas (e.g., for the treatment of rectal or colonic inflammations), and aerosols. Ointments and creams may, for example, be formulated with an aqueous or oily base with the addition of suitable thickening and/or gelling agents. Such bases may thus, for example, include water and/or an oil such as liquid paraffin or a vegetable oil. Thickening agents which may be used according to the nature of the base include soft paraffin, aluminum stearate, cetostearyl alcohol, polyethylene glycols, woolfat, hydrogenated lanolin, beeswax, etc.

Lotions may be formulated with an aqueous or oily base and generally also include one or more of stabilizing agents, emulsifying agents, dispersing agents, suspending agents, thickening agents, coloring agents, perfumes and the like.

Powders may be formed with the aid of any suitable powder base, e.g., talc lactose, starch, etc. Drops may be formulated with an aqueous base or non-aqueous base also comprising one or more dispersing agents, suspending agents, solubilizing agents, etc.

These pharmaceutical compositions may also include one or more preservatives or bacteriostatic agents, e.g., methyl hydroxy benzoate, propyl hydroxy benzoate, chlorocresol, benzalkonium chlorides, etc. These may also contain other active ingredients such as antimicrobial agents, particularly antibiotics and/or steroidal anti-inflammatory compounds.

The proportion of orgotein in the compositions of this invention depends on the precise type of formulations to be prepared but will generally be within the range of from 0.001% to 5% by weight. Generally, however, for most types of preparations advantageously the proportion used will be within the range of from 0.001 to 0.5% and preferably 0.01 to 0.25%.

Examples of such types of oral preparations include the conventional liquid preparations, e.g., solutions, suspensions, and the solid form, e.g., tablets, pills, capsules, encapsulated microspheres. Enteric coated tablets which disintegrate in the intestine, particularly the illium, are preferred. In the preparation of such tablets, the conventional enteric coatings and fillers, e.g., corn starch, lactose, talc, gums, etc., can be used.

PREPARATION 1.—ORGOTEIN

The following is a general procedure for isolating proteins from natural sources thereof to provide a suitable starting proteinaceous material for the process of this invention.

Physically remove as much non-proteinaceous material as possible from a freshly harvested, washed and cleaned plant or animal source of protein. In the case of animal tissue, glands and organs, remove fat, connective tissue and blood vessels. Conduct all subsequent steps below 5° C., except as indicated.

(a) Toluene method

Homogenize the protein source and immediately add 3 vol. of deionized water or of suitable buffer, 0.05—0.30 M, e.g., maleate, phosphate, tris-maleate, barbital, tris-hydroxymethylaminomethane, borate, cacodylate, glycine-sodium hydroxide, etc. containing $1 \times 10^{-4}$ to $2 \times 10^{-1}$ M of a water soluble salt, e.g., chloride, sulfate, phosphate, acetate, citrate, maleate, borate or phosphate, etc. of a physiologically essential divalent metal, e.g., calcium, cobalt, copper, iron, magnesium, manganese or zinc. Adjust to ph 7.0–7.8. Stir the resulting mixture for several hours. Then add slowly 0.01 vol.-equivalent of toluene and continue stirring for several more hours. Let set until the supernatant is reasonably clear. Filter, e.g., through cloth, cotton, glass wool or filter-aid, or centrifuge. Exclude direct light in these operations. Immediately freeze the filtrate and lyophilize it. If direct lyophilization proves difficult, dialyze first against 0.001 M buffer containing $0.1-5 \times 10^{-4}$ M bivalent metal salt, e.g., $Ca^{++}$, $Co^{++}$, $Cu^{++}$, $Fe^{++}$, $Mg^{++}$, $Mn^{++}$, $Zn^{++}$. The resulting powder can be stored in the cold, preferably at below 0° C.

(b) Acetone powder method

Suspend finely disintegrated whole tissue in any of the buffer-$Me^{++}$ mixtures of (a) above, bring to pH 7.0–7.8 and cool the dispersion to 0°. Add to the dispersion very slowly 10 vols. of acetone at −10° C. with rapid mechanical stirring. Let settle for about 10 minutes, and decant the supernatant aqueous acetone. Collect the precipitate either by centrifuging or by vacuum filtration through a No. 1 Whatman paper on a wide Buchner funnel in a cold room at 0°. Wash the precipitate twice by suspending on each occasion in about 3 vol. (calculated from the original volume of dispersion) of acetone at −10° C. Remove the acetone from the precipitate, first using a stream of nitrogen followed by drying the powder in vacuo over $H_2SO_4$. The last acetone treatment can be followed by washing with dry peroxide-free diethyl ether (at −15°), which greatly facilitates rapid drying. Store the dried material in the cold, preferably in vacuo over a drying agent.

Alternatively, disintegrate the whole tissue directly in 10 vol. of acetone at −15° C. in a Waring Blendor (for 3 minutes), and retreat the precipitate with acetone as described above.

If the first acetone precipitate contains much lipid material, washing it with n-butanol at −15° C. greatly improves the subsequent extractions.

Alternatively, cut 1 kg. of fresh bovine liver, free from connective tissue, into five or six pieces, rinse with tap water and mince. Homogenize portions of mince (200 g.) in a Waring Blendor with 200 ml. cold iso-osmotic KCl solution for 20 sec. Immediately mix the homogenate in the blendor with 200 ml. of aceton at −10° C. for another 20 sec. Pour the acetone-treated hemogenate with stirring into a 10 liter beaker containing 2.5 liters of acetone at −10° C. When the final portion of mince has been treated, add to the contents of the beaker cold acetone to a volume of 10 liters and mix. Hold at 4° C. for a few minutes. Decant the clear supernatant and again mix the contents of the beaker with acetone to 10 liters. Decant the clear supernatant and filter the suspension rapidly on a Buchner funnel covered with a sheet to exclude as much air as possible. Before the cake on the funnel is completely dry, wash with 2 liters of cold acetone.

Continue the filtration until the particles are completely dry. Break the up the solid material, spread out on filter paper and air-dry, preferably under a cover of nitrogen. Finely grind the powder while cold and store in vacuo at 4° C. The yield is about 250 g. of powder.

The following is a general procedure for isolating orgotein from the above-described protein concentrate.

All operations are carried out in 0.1 M tris-maleate-$Me^{++}$ buffer at ph 7.4, unless otherwise indicated. 0.05 M to 0.2 M tris-phosphate-$Me^{++}$, tris-succinate-$Me^{++}$, tris-glycine-$Me^{++}$ and tris-HCl-$Me^{++}$ buffers work equally well. All operations involving organic solvents are carried out at 0 to 2° C., or lower using organic solvents pre-cooled to −10° C. All other operations are at temperatures below +5° C., except as indicated.

(c) Removal of buffer-insoluble material

In the cold and in the absence of direct light, stir 100 g. of dry powder, obtained according to Step (b), into one liter of tris-maleate buffer. After several minutes add 6.5 g. $MgSO_4 7H_2O$ in portions and adjust pH to 7.4 with 1 N sodium hydroxide. Then add an additional 600 ml. of tris-maleate buffer and an additional 6.5 g. $MgSO_4 7H_2O$. Re-adjust to pH 7.4. Then add an additional 400 ml. water and continue stirring in cold room until about 6 hours have elapsed from the start of the operation. Let the mixture settle and then filter or centrifuge. Adjust the filtrate to pH 7.8, hold in the cold until precipitation is complete, centrifuge and filter supernatant. For storage, lyophilize the filtrate as described in Step (a).

With some raw materials, e.g., liver, the above step and the antecedent step for preparing the starting material therefor, preferably are carried out with 0.1 M manganese sulfate providing the bivalent metal. Transchelation, i.e., removal of most manganese and replacement by magnesium, is achieved using tris-maleate-magnesium salt buffer in a subsequent step. In some cases, it is desirable to carry the manganese-tris-maleate buffer through the pigment removal step and sometimes even through the heat-treatment step. In still other cases, use of buffer containing other bivalent ions, e.g., Ca, Co, Cu, Fe, Zn, may be desirable in the initial and/or intermediate steps. About a 50% or less yield of powder is obtained, based on the dry weight of the proteins in the starting natural source.

(d) Pigment removal

This step often is necessary with protein fractions obtained from dark-colored sources, e.g., liver, kidney, lung, spleen, jackbeans, certain bacteria, etc. Proteins from other tissues, such as testes, pancreas, placenta with blood clot removed, thymus, heart and other muscle, marine animals and other micro-organisms usually do not require this step.

100 g. of powder from Step (c) are suspended with stirring in 400 ml. cold 0.1 M tris-maleate-$Mg^{++}$ buffer at pH 7.2. Let stand in cold room until the precipitate has settled, centrifuge at 1–2° C. and decant.

If pyridine is used, divide the decanted liquid into five equal parts. Slowly and with stirring, add to each 8.0 ml. of pre-cooled C.P. pyridine. Then add 40 ml. of 0.1 M trismaleate-$Mg^{++}$ buffer to each portion. Centrifuge at 1–2° C., e.g., at 13,000 r.p.m. for 15 minutes. Decant and recombine the supernatants. Discard the precipitate.

If chloroform-ethanol is used, to the decanted liquid slowly and with stirring add 15% by volume of a precooled mixture of one part chloroform and two parts ethanol. The temperature should remain below 4° C. during the addition. Centrifuge, e.g., at 12–14,000 r.p.m. for about 10 minutes, and discard the dark-colored precipitate. The lightly colored, opalescent supernatant is kept cold.

At this point, the partially purified desired protein can be precipitated with solvent, the precipitate freed of adhering solvent in vacuum, re-dissolved in about 0.15 M tris-maleate-$Mg^{++}$ buffer, pH 7.4. Any insolubles are removed by centrifugation and discarded.

The thus-obtained solution can be lyophilized, with or without prior dialysis. The resulting off-white powder is stable for several months when kept in the freezer.

(e) Less soluble material removal

The cold tris-maleate-$Mg^{++}$ buffer solution from step (c) or (d) at a pH of about 6.0 to 7.5, or its freshly made equivalent from lyophilized powder, is brought to 40–45% of saturation with ammonium sulfate, added with stirring in portions either as solid or as saturated aqueous solution. Hold the temperature at 0–5° C. Keep the mixture 10–30 minutes in the cold until precipitation is complete. Centrifuge at 8,000–12,000 r.p.m. and discard the precipitate. Keep the supernatant for several hours in the cold. Centrifuge and discard any further precipitate.

Alternatively, to a 250 ml. portion of the supernatant obtained from step (d) or 62 g. of pigment-free protein obtained in step (c) and dissolved in 250 ml. of 0.1 M tris-maleate-$Mg^{++}$ buffer at pH 7.5, slowly add with stirring about 0.9 volume of ethanol or about 0.75 volume of acetone pre-cooled to −10° C., i.e., an amount sufficient to precipitate only a portion of the proteins. The temperature of the mixture should not exceed +2° C. As soon as precipitation is complete, centrifuge in the cold, e.g., at 8,000–12,000 r.p.m., and discard the precipitate.

(f) Heat labile protein removal

Heat the supernatant obtained from step (e) in a round-bottom flask or glass lined kettle in a bath kept at 65–70° C. Stir the solution vigorously until the temperature of the contents reaches about 59° C. and hold for about 20 minutes at or near this temperature. Immediately thereafter immerse the flask into a Dry Ice-solvent or an ice-salt bath and continue stirring vigorously until the temperature has dropped to 2–5° C. Centrifuge the resulting bulky precipitate in the cold and discard.

(g) More soluble material removal (1) *Salt precipitation.*—Preferably at a pH of about 6.0 saturate the buffer solution from step (f) with ammonium sulfate as above to 58–76% and hold ½ to 2 hours in the cold until precipitation is complete.

Take up the nearly white ammonium sulfate precipitated material in 10–15 times its weight of 0.10 M tris-maleate-$Mg^{++}$ buffer and hold for ½ hour in the cold. Centrifuge off and discard any insoluble or further precipitate.

(2) *Solvent precipitation.*—To the same starting solution as used in (1), preferably at a pH of about 3.5 or about 7.5, add in portions and with stirring pre-cooled (−10° C.) acetone or ethanol, keeping the temperature around 0° C., in an amount sufficient to precipitate at least a portion of the proteins in solution. If, for instance, 0.5 volumes of acetone were used to precipitate less soluble proteins, use about 0.5 to 1.5 additional volumes. Keep the mixture for a few minutes at about 0° C. until the precipitation is complete. Centrifuge the precipitate at 1° C. or below (10,000–13,000 r.p.m.). Separate and free the precipitate from adhering solvent under vacuum in the cold. Check the supernatant for the extent of precipitation by addition of 0.2 volume of pre-cooled (−10° C.) acetone or ethanol. Isopropyl alcohol (0.5–2 v./v.) can also be used.

Preferably, ammonium sulfate fractionation is used to precipitate the less soluble proteins and solvent fractionation to precipitate the desired protein.

(h) Electrophoresis

Fractionate a solution of the protein precipitated by step (g) in 10–15 times its weight of 0.1 M tris-maleate-$Mg^{++}$ buffer (discarding any insoluble material) by gel electrophoresis using polyacrylamide with the running gel at pH 8.0 to 9.5 or at pH 3.0 to 4.3.

The following apparatus is used in the gel electrophoresis step:

Electrophoresis chamber; Buchler power supply; loading rack; syringes (disposable plastic 20 cc., 5 cc., 1 cc.); syringe needles 22 G x 1½ and 25 G x ⅝; Teflon tips for layering tool; photopolymerizing light (fluorescent light source).

The electrophoresis chamber should be thoroughly washed and rinsed in distilled water. The chamber is then immersed in a Siliclad (Clay-Adams, New York) solution (1 part Siliclad to 50 parts of water) for a few minutes. It is then rinsed and oven-dried.

The electrophoresis chamber used is the special production model described heretofore.

The reagents used are the following:

Acrylamide monomer (Eastman No. 5521); N,N'-methylenebisacrylamide BIS (Eastman No. 8383); Riboflavin (Eastman No. 5181); N,N,N',N'-tetramethylethylenediamine TEMED (Eastman No. 8178); glycine (Eastman No. 445); TRIS(tris-hydroxymethylaminomethane) (Fisher T-395); Sucrose (Baker No. 4072); Ammonium persulfate reagent grade; 1 N HCl; 1 M $H_3PO_4$; acetic acid; and methanol (reagent grade). Small pore gel, 7%, is used.

The stock solutions used are:

(a) 1 N HCL, 480 ml.; TRIS, 363 g.; TEMED, 4.6 ml.; and $H_2O$ to make 1,000 ml. (b) 1 M $H_3PO_4$; 256 ml.; TRIS, 57 g.; and $H_2O$ to make 1,000 ml. (pH 6.9). (c) Acrylamide, 280 g.; TRIS, 7.36 g.; and $H_2O$ to make 1,000 ml. (d) acrylamide, 100 g.; TRIS, 25 g.; and $H_2O$ to make 1,000 ml. (e) riboflavin, 40 mg. and $H_2O$ to make 1,000 ml.

Working solutions used are:

Mixture A: 1 part (a); 2 parts (c); and 1 part ($H_2O$).
Mixture B: Ammonium persulate, 1.00 g.; and $H_2O$, 1,000 ml.

The buffer solution used is: TRIS, 60 g.; glycine, 288 g.; $H_2O$ to 20 liters; pH, 8.45.

Tracking dye used is 0.001% Bromphenol Blue. It was found that for the best separations fresh buffer should be used for each run. The buffer can be used for a maximum of 3 runs with some loss of resolution on the second and third runs. All solutions should be stored in the refrigerator. If they are, they are usable for several months, except mixture B which should be made fresh weekly.

Equal parts of mixture A and mixture B taken directly from the refrigerator are mixed in a filtering flask. The flask is attached to the aspirator and the contents are swirled gently for about a minute in a partial vacuum. The chamber is then filled with the cover on, to ⅝ inch from the top using a long thin tube. The thin tube is inserted to the bottom of the chamber and is slowly withdrawn as the slab is filled, keeping the tip beneath the gel surface. The gel is then water layered and placed on top of a drying oven. Gelling is complete in about 15 to 30 minutes.

A water layering tool can be made from a plastic syringe and a 25 G x ⅝ inch needle tipped with a Teflon tip (Analytical Chemists, Inc.). The syringe is filled about ⅓ full with water, tinted blue with tracking dye solution. The Teflon tip is placed just beneath the surface of the gel and moved upwards as the water is expelled onto the gel. The tip should at no time be lifted above the surface of the liquid.

After polymerization, the water is carefully removed. The surface is rinsed once with degassed sucrose gel.

The sample (0.5–5.0 g.) is suspended in water, 0.9% saline or in tris buffer, mixed with gel and filled into the pre-formed trough of the gel slab. The surface is sucrose layered and sealed with a capping gel. Capping gel is added until a convex miniscus is formed. A plastic cover is then slid across the top so that no air bubbles are trapped. The loaded trough is placed between two fluorescent lamps as close to the lights as possible. Polymerization is complete between 30 minutes and an hour depending on the amount and nature of sample used.

When polymerization is complete as indicated by opacity of sample and capping gels, the cover is removed and the chamber loaded into the buffer reservoirs. The apparatus and buffer are pre-cooled before a run and the run is made at about 5° C. or less. The power supply is set to give constant current which is set at 100–200 ma. depending on the amount of sample and the size of the gel slab. A run takes 2–6 hours and at the end the tracking dye will have traversed nearly the whole slab.

After the run the desired protein chelate is found in the area comprising about 20–30% of the distance travelled by the tracking dye from the point of origin. It is well-separated from the much faster travelling albumin and albumin-type fractions and also well-separated from the small amounts of much slower travelling extraneous protein fractions.

The desired protein chelate is eluted from the gel by a cross-current of tris-maleate buffer 0.1 M containing 0.001 M $Mg^{++}$. Progress of the elution is monitored by U.V. absorption at 280 mµ. Uniformity is checked by analytical disc gel electrophoresis followed by staining with Amido Black. If desired, the albumin-type and the slow fractions can be recovered in a similar manner using tris-maleate buffer.

In the cationic system at pH 3.8 in the running gel, potassium ion is used as the leading ion and β-alanine as the trailing ion. Acetic acid is used as the buffer. The procedure followed with these systems is the same as that used with the anionic system (running gel pH 9.4).

To isolate the desired protein chelate from the eluate, dialyze exhaustively against 0.0001 M tris-maleate-$Mg^{++}$ buffer and then against deionized water and lyophilize. A white fluffy powder representing about 6–16% of the ammonium sulfate or solvent precipitated product is obtained.

A typical overall yield of isolated protein chelate is 0.005 to 0.015%, calculated on the dry weight of the original source material.

PREPARATION 2.—ORGOTEIN

The following are examples of an improved process for the isolation of orgotein claimed in the application of W. Huber, S.N. 657,866, filed Aug. 2, 1967.

All operations, unless otherwise indicated, are carried out in a cold room (2–5° C.).

(a) Removal of insoluble material

Finely macerated fresh beef liver is mixed with cold 0.025 M tris-glycine buffer containing 0.01 M $Mn^{++}$ at pH 7.5 (two liters per kg. of liver). Adjust pH to 7.5 if necessary. Thereafter, if the liver is fatty, 50 ml. of toluene per kg. of liver are added. The mixture is stirred 4–6 hours. The resulting suspension is centrifuged at 20,000 G. for 10–20 minutes or pressed through plastic gauze and the insolubles discarded.

(b) Removal of more soluble material

To the aqueous filtrate obtained in the preceding step is added rapidly and with thorough agitation 1.25 volumes of cold acetone (−10° C.) through a glass tube extending well below the surface of the mixture. The ensuing precipitate is immediately collected by centrifuging, e.g., for 10 minutes at 20,000 G. Completeness of precipitation is checked by adding an additional 0.25 to 0.50 volumes of acetone to the filtrate. Any additional precipitate is also collected. The precipitated proteins are quickly suspended with about 25% (v./v.) of 0.025 M tris-glycine buffer at pH 7.5 containing 0.01 M $Mn^{++}$, calculated on the volume of the filtrate before addition of the acetone. The mixture is stirred in the cold room for several hours. The insolubles are removed by centrifuging and the clear supernatant is adjusted to achieve an about 10% protein concentration. Protein concentration can be determined by Biuret analysis or other standard method.

(c) Heat labile protein removal

The thus-obtained buffer solution is heated rapidly to about 60° C. with stirring in a stainless steel or glass lined kettle and maintained at or close to 60° C. for about 20 minutes. Thereafter, the mixture is cooled to about 5° C. as rapidly as possible and the bulky precipitate is filtered in the cold room by slow suction over a broad filter surface or centrifuged at 12,000 to 16,000 G. for 10 minutes. The precipitate is re-extracted, using small amounts of cold buffer, and the clear supernatants combined. The precipitate is discarded.

(d) Removal of less soluble material and transchelation

The solution from the heat treatment step is concentrated, if necessary, to a protein concentration of about 8 percent, e.g., using an ion selective membrane (diaflo membrane, Amicon Corp., Cambridge, Mass.) to remove excess buffer. The protein solution is mixed slowly and with stirring with cold saturated ammonium sulfate solution containing $10^{-3}$ M $Mg^{++}$, $10^{-4}$ M $Cu^{++}$ and $10^{-5}$ M $Zn^{++}$ to a 45% $(NH_4)_2SO_4$ concentration. Stirring is continued for another 15 minutes and the resulting precipitate is removed by centrifuging at 20,000 G. for thirty minutes at 0° C. and discarded. To the filtrate is added an additional amount of the saturated ammonium sulfate solution to bring the protein solution to 65% $(NH_4)_2SO_4$ concentration. The resulting precipitate contains the desired protein and is collected by centrifugation or filtration. The final supernatant is discarded.

(e) Gel filtration

The final precipitate from the $(NH_4)_2SO_4$ step is dissolved in 0.025 M tris-HCl or tris-glycine or 0.01 M phosphate or borate buffer, containing $10^{-3}$ M $Mg^{++}$, $10^{-4}$ M $Cu^{++}$ and $10^{-5}$ M $Zn^{++}$, at pH 7.8 to a concentration as close to 10% (w./v.) as possible and dialyzed against cold buffer until negative to sulfate ion. The dialized solution, after clarification by centrifugation, if necessary, is passed through a Millipore filter. The filtrate is applied directly to the head of chromatography columns (3 x 18 in.) filled with Sephadex G–100 or G–75 (epichlorohydrin cross-linked dextran resin, Pharmacia, Sweden). The Sephadex has been swelled, refined and washed by standard techniques described in literature of the manufacturer. The packed columns are equilibrated with one of the above-described buffers and adjusted to a flow rate of about 20 ml. per hour. The addition of 5–10% dextrose or sucrose to the solution improves uniformity of adsorption, which facilitates subsequent resolution.

After application to the column, the sample is permitted to equilibrate within the first few cm. of the resin bed for approximately 30–45 minutes, at which time fractionation is started, the column being developed with additional buffer solution. Individual fractions of up to 10 ml. are collected. The emergence of peaks is determined by measuring the protein concentration by the absorbance at 280 millimicron.

Two and sometimes three peaks emerge from the column prior to the emergence of the desired protein. They represent albumin and other undesirable protein impurities of similar or larger molecular volume. Fractions representing these peaks are discarded. The desired protein generally emerges in the range of 130–170 ml. of total eluate. These fractions are combined for further processing. Residual, lower molecular weight protein impurities emerge from the column on further elution, particularly on increasing the ionic strength of the buffer. They are removed to clear the column for a subsequent run.

(f) Buffer and excess $Me^{++}$-ion removal

The combined fractions containing the desired protein are filtered through a column of mixed bed resin Amberlite MB-1 monobed gel-type ion exchange resin (Rohm & Haas), a styrenedivinyl benzene strongly acidic ($—SO_3^-H^+$) strongly basic

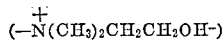

group-containing mixed copolymer which reduces buffer, $Mg^{++}$, $Cu^{++}$ and $Zn^{++}$ ion concentration to less than $10^{-7}$ M.

A column 1.45 x 45 inches is half filled with demineralized water from which all air bubbles have been removed. A slurry of the resin in air-free demineralized water is poured gently into the column and allowed to settle. The column is then backwashed several times with demineralized water to constant pH (ca. 7.1) and ionic strength (conductance about 1.0 mho) of the effluent. The final bed height is 33 inches, giving a bed volume of 58.3 cubic inches (957 milliliters) and total exchange capacity of 440 milli-equivalents, based on a factor of 0.46 given by the manufacturer for this resin.

The fractions from the gel filtration step containing the desired protein are combined and concentrated, if necessary, to a protein content of 8–10%. This solution is carefully loaded onto the top of the column and thereafter developed with demineralized water. The flow rate is adjusted to about 20 milliliters per minute and the appearance of the protein in the eluate is monitored by ultraviolet absorption ($A_{280}$). The eluate is collected in about 25 milliliter fractions. The desired protein generally appears in the fourth to twelfth fractions. Buffer-$Me^{++}$ concentration drops well below $10^{-7}$ M, as indicated by a drop of conductivity from 4,000 to 5,000 mho before column filtration to 1.5–2.5 mho thereafter.

Following the above-described process, 75 kg. of fresh beef liver (22.5 kg. dry weight), yields about 25–40 grams (0.12–0.17%) of final precipitate from the $(NH_4)_2SO_4$ step and 7 to 9 grams of the final, fully purified desired protein, equivalent to an over-all yield of 0.032–0.041% calculated on the dry weight of the liver, a 300 or more percent increase in yield over that obtained by the process described in Ser. No. 576,454.

In an alternative procedure, the filtrate from step (a), instead of being diluted with acetone, is first heated for about 20 minutes at or close to 60° C., then rapidly cooled to about 5° C. The resulting precipitate is removed by filtration or centrifugation and discarded. The filtrate is then treated with acetone as in step (b). Step (c) is omitted. The precipitate obtained from the acetone treatment is dissolved in 0.025 M tris-glycine buffer containing $10^{-3}$ M $Mg^{++}$, $10^{-4}$ M $Cu^{++}$, $10^{-5}$ M $Zn^{++}$ at pH 7.5 adjusted, if necessary, to a protein concentration of about 8% and then treated as in steps (d), (e) and (f).

PREPARATION 3.—ORGOTEIN

The following is an example of a process for the removal of the tenacious impurity present in substantially pure orgotein isolated from beef liver in the manner described in Preparation 1, which process is claimed in the application of W. Huber, Ser. No. 3,538, filed Jan. 16, 1970.

Impure lots of orgotein containing 28.2, 20.9 and 27.8%, respectively, of "slow moving" (on gel electrophoresis in thin film agarose) impurities and 17.1, 19.9 and 11.8%, respectively, of "background impurities" (causing a smearing on gel electrophoresis) were selected by virtue of their high content of impurities from rejected batches. In the Ungar anti-inflammatory bioassay one of these lots had failed badly while the others had failed marginally.

The buffer used was 0.1 M phosphate, pH 6.0; $NaH_2PO_4$-$Na_2HPO_4$ (1:7 vol./vol.). The anion exchange resin used was Whatman DEAE cellulose-52, microgranular (W. & R. Balston, Ltd., Hardstone, Kent, England). This ion exchanger is supplied wet and pre-swollen, thus obviating the need for re-suspension.

To prepare the column, 30 g. of the DEAE-cellulose was stirred into 300 ml. of 0.1 phosphate buffer, pH 6.0. The slurry was allowed to settle and the supernatant decanted. 0.01 M phosphate buffer, pH 6.2, was added and the mixture stirred thoroughly. The slurry was allowed to settle for 10 minutes and the supernatant decanted. This step serves both to equilibrate the cellulose with the buffer and to remove the fines, which is important since they reduce the column flow rate. Washing the cellulose with the starting buffer was repeated until both the pH and the conductivity remained constant at the correct values. Gentle vacuum was applied to the slurry to remove occluded air and carbon dioxide. The slurry was used immediately for column packing. If the resin is left in contact with buffers or polyelectrolytes for longer than one week, a preservative, e.g., 0.03% toluene, should be added.

A glass column of 1.5 cm. diameter fitted with a nylon net and a millipore filter support unit at the bottom was mounted vertically. The column was filled with 0.01 M sodium phosphate buffer, pH 6.2. The equilibrated and relatively thick DEAE-cellulose slurry (about 120–150% of original volume) was poured into the column through a funnel attached to the top of the column. The column top was closed until 1 cm. of the cellulose had settled at the bottom. The column top was then opened to allow free flow. A column of about 20 cm. was packed using settling times of 20–30 minutes. The slow sedimenting fines at the top of the column were removed by suction. The column was equilibrated by running starting buffer through for several hours or overnight. The pH and conductivity of the eluate were checked to ensure full equilibration between the exchanger and the buffer. Flow rate was adjusted by hydrostatic pressure by placing the buffer source about 40 cm. above the head of the column, which produces a flow rate of about 30 ml. per hour for a column of 1.5 cm. in diameter and 20 cm. in height with a bed volume of 30 ml.

100–200 mg. of the starting orgotein was dissolved in 2–4 ml. of starting buffer and the resulting greenish solution layered gently over the surface of the bed. After absorption, the orgotein solution appears as a broad greenish band near the top of the column. The column was then connected to the buffer reservoir and elution begun with 0.01 M phosphate buffer, pH 6.2. Five ml. fractions were collected, using a Simplex (B. Braun, Melsungen, West Germany) fraction collector. The column was operated at room temperature and the collected fractions were cooled by ice water. Upon application of the elution buffer, a brownish-pink band separated from the sample zone on the column. It moved rapidly downwards and was eluted immediately after the void volume, requiring a buffer volume of 40–50 ml. The material had a high absorbance at 280 m$\mu$ and by subsequent gel electrophoresis was shown to consist entirely of the slow moving impurity described above. After pooling of the fractions containing the slow-moving impurities, elution was continued with 0.01 M phosphate buffer, pH 6.2, to a total volume of about 300 ml. After about 120 ml. of eluate had been collected, additional material with less pronounce absorbance at 280 m$\mu$ was eluted. Subsequent electrophoresis of appropriately pooled fractions showed this material to be composed of background impurities described above. After elution of the background impurities no further material could be eluted with 0.01 M phosphate buffer, pH 6.2.

Elution of the orgotein was carried out by stepwise increase of buffer ionic strength. No significant elution was observed until ionic strength had been increased about tenfold to 0.10 M, pH 6.2. At this point the zone remaining at the top of the column migrated rapidly downward as a sharp, light green band with the buffer front. Complete elution was achieved with about 60 ml. of 0.1 M buffer.

Eluate fractions 68 to 76, which contained the orgotein, were pooled, extensively dialyzed and then lyophilized. Dialysis for 3 to 5 days with numerous changes of deionized water were required to remove all extraneous non-chelated ions. In subsequent runs, increased ionic strength was achieved by the addition of 0.09 M NaCl to the starting buffer. This reduced the dialysis time required to remove extraneous non-chelated ions to about 2 days.

EXAMPLES (A) Lyophilization stabilization

Fifteen parts of orgotein and thirty parts of the selected sugar or sugar derivative are weighed and mixed. The mixture is dissolved in 30 parts of demineralized water that has been adjusted to pH 9.4 by gaseous ammonia. The solution is then filtered with slight vacuum through an 0.45$\mu$ pre-wetted millipore filter. The volume of filtrate is measured and the weight of protein therein calculated as follows: 2 ml. of the filtrate is mixed with 3 ml. biuret reagent and the mixture incubated for 15 minutes at 37° C. Absorbance at 555$\mu$ of the mixture is measured against a water (buffer) blank. Concentration in mg./ml. is determined by multipliying absorbance at 555$\mu$ by 9.1. This conversion factor was obtained by plotting the following data obtained from samples of known concentration on a graph:

| Protein conc. mg./ml.[1] | Absorbance $A_{555}$ |
|---|---|
| 3.7 | 0.407 |
| 1.8 | 0.197 |
| 0.9 | 0.100 |
| 0.45 | 0.050 |
| 0.22 | 0.024 |
| 0 | 0 |

[1] Dry weight (ca. 10% less than wet weight).

The sample is then shell-frozen, and thereafter lyophilized. The lyophilized material is reconstituted to approximately the initial concentration by adding the appropriate volume of demineralized water brought to pH 9.4 with ammonia. The solution is checked whether it is clear or not, then filtered through a pre-wetted 0.45$\mu$ millipore filter and its absorbance at 280 m$\mu$ measured. The $A_{280}$/mg. is determined. The weight of protein lost is expressed by the difference between the protein concentration calculated from the weight of orgotein and volume of solution before lyophilization and the weight of orgotein and volume of solution after lyophilization. Percent loss is expressed as percent of the calculated protein present before lyophilization. The same procedure is repeated for successive lyophilizations.

Tables IV and V list the results of stabilization studies with various polyhydroxy stabilizers following the above procedure. Protein loss after one and four lyophilizations were determined. It can be seen the saccharides listed in Table IV are excellent stabilizers, reducing protein loss after four lyophilizations to about 15% or less, compared with 61–80% for the unstabilized protein and, except for $\alpha$-methyl-D-glucoside, producing a crystal clear solution when the mixture of saccharide and orgotein was redissolved. The saccharides listed in Table V improve the stability of orgotein to a lesser extent and usually produce a turbid solution when the mixture is reconstituted with water or isotonic solution. The latter result renders the saccharides listed in Table V less desirable from a commercial point of view, even though they also substantially reduce protein loss.

TABLE IV.—EFFECT OF LYOPHILIZATION

| Stabilizer | Appearance of lyophilizate | Conc. of starting protein solution (mg./ml.) | Initial $A_{280}$ | (+)$\Delta A_{280}$/mg. 1 lyophilization | (+)$\Delta A_{280}$/mg. 4 lyophilizations | Appearance of reconstituted solution 1 lyophilization | Appearance of reconstituted solution 4 lyophilizations | Percent protein loss 1 lyophilization | Percent protein loss 4 lyophilizations |
|---|---|---|---|---|---|---|---|---|---|
| I. Monosaccharides: | | | | | | | | | |
| a. $\alpha$-D-galactose | Granular | 0.48 | 0.642 | 0.033 | 0.064 | Clear | Clear | 2.1 | 2.1 |
| b. Fructose | do | 0.46 | 0.641 | 0.034 | 0.071 | do | do | 3.3 | 5.4 |
| c. D(−)arabinose | do | 0.55 | 0.525 | 0 | 0.066 | do | do | 0 | 3.6 |
| d. L(+)arabinose | do | 0.55 | 0.527 | 0 | 0.011 | do | do | 0 | 0 |
| e. D-fucose | do | 0.53 | 0.528 | 0.004 | 0.051 | do | do | 0 | 0 |
| f. D-glucose | do | 0.51 | 0.606 | 0.053 | 0.211 | do | do | 5.9 | 1.57 |
| g. D(+)mannose | do | 0.48 | 0.568 | 0.028 | 0.222 | do | do | 2.0 | 14.0 |
| II. Disaccharides: | | | | | | | | | |
| a. Sucrose | do | 0.49 | 0.604 | 0 | 0.058 | do | do | 0 | 6.1 |
| III. Alkyl glycosides: | | | | | | | | | |
| a. $\alpha$-methyl-D-glucoside | do | 0.54 | 0.681 | 0 | 0.072 | do | V. sl. turbid | 0 | 1.8 |
| b. $\beta$-methyl-D-galactoside | Fluffy | 0.42 | 0.681 | 0.014 | 0.054 | do | Clear | 0 | 2.6 |
| IV. Control: | | | | | | | | | |
| a. No stabilizer | do | 0.48 | 0.662 | (1) | (1) | | | 12.5 | 79.2 |
| b. No stabilizer | do | 0.46 | 0.663 | (1) | (1) | | | 10.9 | 60.8 |

[1] Turbid with insoluble flakes.

TABLE V.—EFFECT OF LYOPHILIZATION

| Stabilizer | Appearance of lyophilizate | Conc. of starting protein solution (mg./ml.) | Initial $A_{280}$ | (+)ΔA$_{280}$/mg. 1 lyophilization | (+)ΔA$_{280}$/mg. 4 lyophilizations | Appearance of reconstituted solution 1 lyophilization | Appearance of reconstituted solution 4 lyophilizations | Percent protein loss 1 lyophilization | Percent protein loss 4 lyophilizations |
|---|---|---|---|---|---|---|---|---|---|
| V. Disaccharides: | | | | | | | | | |
| a. Maltose | Fluffy | 0.44 | 0.638 | 0.132 | 0.186 | Sl. turbid | Sl. turbid | 13.6 | 15.9 |
| b. Lactose | do | 0.40 | 0.643 | 0.119 | 0.244 | do | do | 12.5 | 22.5 |
| VI. Sugar alcohols: | | | | | | | | | |
| a. Sorbitol | do | 0.47 | 0.628 | 0.053 | 0.154 | V. Sl. turbid | V. Sl. turbid | 8.5 | 17.0 |
| b. Mannitol | do | 0.48 | 0.604 | 0.051 | 0.115 | do | do | 6.2 | 10.4 |
| c. Inositol | do | 0.46 | 0.633 | 0.126 | 0.217 | Sl. turbid | Sl. turbid | 10.9 | 30.4 |
| d. Dulcitol | do | 0.48 | 0.619 | 0 | | Clear | V. sl. turbid | 0 | 39.6 |
| VII. Sugar acids: | | | | | | | | | |
| a. D-glucuronic acid | Granular | 0.49 | 0.610 | 0.194 | 0.020 | Cloudy | Clear [1] | 53.1 | 77.6 |
| b. D-galacturonic acid | do | 0.44 | 0.658 | 0.138 | 0.007 | Sl. cloudy | Clear [1] | 40.9 | 63.7 |

[1] Because of the small amount of protein remaining after the preceding lyophilizations.

(B) Solid storage stability 25 mg. of freshly prepared orgotein and 50 mg. of sucrose, fructose or galactose were dissolved in 50 ml. of demineralized water, brought to an alkaline pH (around 9) with ammonia water, filtered and lyophilized. The lyophilizates were kept under air at room temperature along with the sample of the starting protein metal chelate. The storage stability of the mixtures at room temperature for various periods of time is shown in Table VI, as determined by the $A_{280}$ of solutions of the samples prepared after the sample had been stored for the indicated time.

TABLE VI.—ROOM TEMPERATURE STABILITY OF SOLID MIXTURES OF ORGOTEIN AND SACCHARIDES

| Stabilizer | $A_{280}$/mg. | $A_{555}$ (corr.) |
|---|---|---|
| 1. Sucrose: | | |
| Initial | 0.637 | 0.052 |
| 1 week | *0.595 | 0.041 |
| 1 month | 0.633 | 0.041 |
| 2 months | 0.637 | 0.040 |
| 4 months | 0.602 | 0.047 |
| 6 months | 0.613 | 0.048 |
| 2. Fructose: | | |
| Initial | 0.631 | 0.050 |
| 1 week | *0.589 | 0.048 |
| 1 month | 0.768 | 0.037 |
| 2 months | 0.666 | 0.046 |
| 4 months | 0.758 | 0.055 |
| 6 months | 0.626 | 0.056 |
| 3. Galactose: | | |
| Initial | 0.630 | 0.051 |
| 1 week | 0.615 | 0.044 |
| 1 month | 0.649 | 0.041 |
| 2 months | 0.689 | 0.042 |
| 4 months | 0.673 | 0.055 |
| 6 months | 0.669 | 0.047 |

*Temporarily slightly lower readings after about 1–2 weeks storage are consistently observed. All samples reconstituted after storage into clear precipitate-free solutions.

These data indicate no significant protein degradation after 6 months storage of the lyophilized protein-saccharide mixture. The protein alone shows a 50 percent loss in one month.

To determine stability at 37° C., 50 mg. of orgotein was dissolved in 100 ml. of a 1 mg./ml. solution of sucrose in water, the pH adjusted to 9.4 with ammonia water and filtered through a 0.45μ millipore filter. An aliquot was withdrawn to determine $A_{280}$ and protein concentration. The remainder was lyophilized for 4 days and stored at 37° for various periods of time. The results are shown in Table VII.

TABLE VII.—STORAGE STABILITY AT 37° C. OF SUCROSE-ORGOTEIN MIXTURE

| Storage time | $A_{280}$/mg. | $A_{555}$ (corr.) | Appearance of reconstituted solution |
|---|---|---|---|
| Initial | 0.5194 | 0.038 | Clear. |
| 1 week | 0.4846 | 0.041 | Do. |
| 2 weeks | 0.5216 | 0.039 | Do. |
| 1 month | 0.5081 | 0.039 | Do. |
| 2 months | 0.5324 | 0.039 | Do. |

These data show no significant protein degradation has occurred after 2 months storage of the lyophilizate at 370° C. Pure orgotein alone shows a 50 percent loss in 11 days.

(C) Solution storage stability 25 mg. of orgotein and 50 mg. of sucrose, maltose or dulcitol were dissolved in 50 ml. of demineralized water in the manner described above. The solutions were maintained at room temperature for various periods of time and protein loss determined. The results are shown in Table VIII.

TABLE VIII.—ROOM TEMPERATURE STABILITY OF SOLUTIONS

| Stabilizer | $A_{280}$/mg. | $A_{555}$ (corr.) | Appearance of solution |
|---|---|---|---|
| 1. Sucrose: | | | |
| Initial | 0.562 | 0.055 | Clear. |
| 1 week | 0.640 | 0.052 | Do. |
| 3 weeks | 0.626 | 0.045 | Do. |
| 5 weeks | 0.702 | 0.051 | V. sl. turbid.* |
| 2. Dulcitol: | | | |
| Initial | 0.618 | 0.052 | Clear. |
| 1 week | 0.637 | 0.054 | Do. |
| 3 weeks | 0.696 | 0.049 | Do. |
| 5 weeks | 0.660 | 0.055 | Do. |
| 3. Maltose: | | | |
| Initial | 0.603 | 0.065 | Do. |
| 1 week | 0.725 | 0.061 | Do. |
| 3 weeks | 0.759 | 0.063 | Do. |

*Possibly due to bacterial contamination.

These data show no significant protein degradation after three weeks or more storage at room temperature of an aqueous solution of the protein-sucrose and protein-dulcitol mixtures. The protein-maltose mixture shows signs of protein degradation. A solution of pure orgotein alone shows a protein loss of >70 percent within 36 hours.

What is claimed is:

1. An intimate solid physical mixture of orgotein, a metalloprotein characterized physically by being the isolated, substantially pure form of a globular, buffer and water-soluble protein having a highly compact native conformation which, although heat labile, is stable to heating for several minutes at 65° C. when dissolved in a buffer solution containing a salt of a divalent metal having an ionic radius of 0.60 to 1.00 A. and which on gel electrophoresis gives a characteristic multiple-band pattern; chemically, by containing all or all but one of the essential aminoacids, a small percentage of carbohydrate, no lipids, 0.1 to 1.0% metal content provided by one to 4 gram atoms per mole of one or more chelated divalent metals having an ionic radius of 0.60 to 1.00 A., and substantially no chelated monovalent metals or cell poisons in the molecule; pharmacodynamically, by being a non-toxic, substantially non-antigenic injectable protein whose pharmacological activity includes anti-inflammatory activity which, like its compact conformation, is related to its chelated divalent metal content; and immunologically, by being a member of a family of protein congeners whose immunological relatedness is sufficient to enable its antibodies prepared in the rabbit or other suitable animal to recognize as an antigen one or more other congeners or for one or more of the antibodies to another congener to recognize it as an antigen, as evidenced in gel immunoelectrophoresis or gel immunodiffusion; and a stabilizing amount of a saccharide selected from the group consisting of (a) sucrose, (b) a pentose, hexose, heptose, aldose or ketose having a hydroxy group on the carbon atom adjacent a free keto or aldehyde carbonyl group and whose spatial configuration is opposite that of two hydroxy groups on the next two adjacent carbon atoms, (c) a lower-alkyl acetal of a pentose, hexose or heptose, (d) glucose, and (e) mannose.

2. A mixture according to claim 1 wherein the stabilizing saccharide is sucrose.

3. A mixture according to claim 1 wherein the stabilizing saccharide is a pentose, hexose or heptose having a hydroxy group on the carbon atom adjacent the carbonyl group whose spatial configuration is opposite that of two hydroxy groups on the next two adjacent carbon atoms.

4. A mixture according to claim 1 wherein the weight ratio of saccharide to orgotein is at least 2:1.

5. A mixture according to claim 1, substantially free from denatured protein.

6. A mixture according to claim 5 wherein the stabilizing saccharide is sucrose.

7. A mixture according to claim 5 wherein the stabilizing saccharide is a pentose, hexose or heptose having a hydroxy group on the carbon atom adjacent the carbonyl group whose spatial configuration is opposite that of two hydroxy groups on the next two adjacent carbon atoms.

8. A mixture according to claim 5 wherein the weight ratio of saccharide to orgotein is at least 2:1.

9. A method of producing a composition according to claim 5 which comprises the step of freeze-drying an aqueous solution thereof which is substantially free from denatured protein.

10. A method according to claim 9 wherein the stabilizing saccharide is sucrose.

11. A method according to claim 9 wherein the stabilizing saccharide is a pentose, hexose or heptose having a hydroxy group on the carbon atom adjacent the carbonyl group whose spatial configuration is opposite that of two hydroxy groups on the next two adjacent carbon atoms.

12. A method according to claim 9 wherein the weight ratio of saccharide to orgotein is at least 2:1.

13. A biological preparation, suitable for injection, comprising a composition according to claim 1, substantially free from denatured protein, hermetically sealed in a sterile condition, in a vial or ampule.

14. A biological preparation according to claim 13 wherein the saccharide is sucrose, present in a proportion to the orgotein of at least 2:1.

15. A mixture according to claim 1 wherein the stabilizing saccharide is sucrose, fructose or galactose.

16. A method according to claim 9 wherein the stabilizing saccharide is sucrose, fructose or galactose.

17. A biological preparation according to claim 13 wherein the stabilizing saccharide is sucrose, fructose or galactose.

References Cited
UNITED STATES PATENTS 3,057,781　10/1962　Mace et al. _____ 424—101
3,133,001　5/1964　Muset _____ 195—68

FOREIGN PATENTS 6614177　4/1967　Netherlands.

HOWARD E. SCHAIN, Primary Examiner

U.S. Cl. X.R.

206—84; 260—112 R, 113; 424—176, 177